DISPENSING GUN
Original Filed March 28, 1963 3 Sheets-Sheet 1
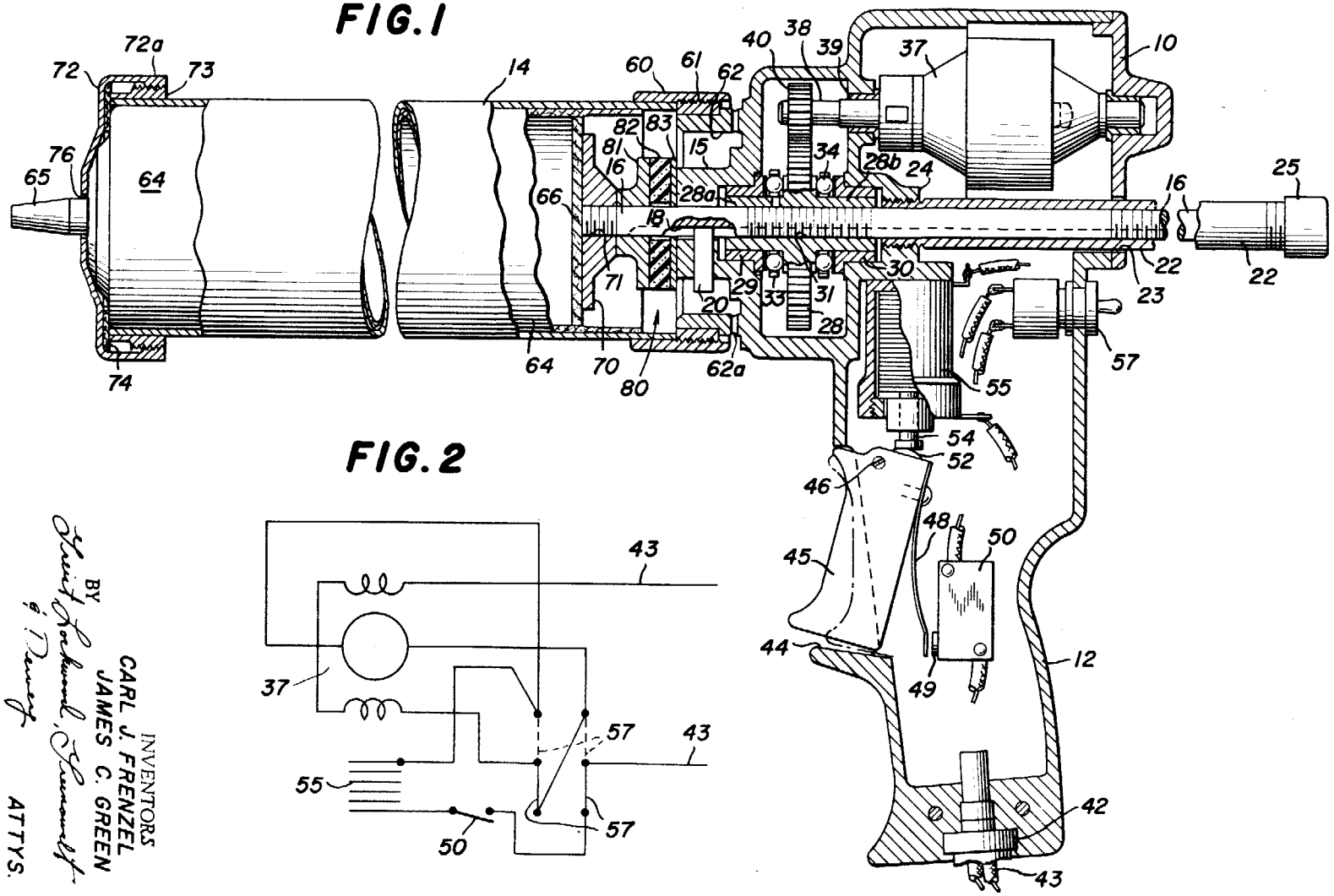
INVENTORS
CARL J. FRENZEL
JAMES C. GREEN
BY
Trent, Lockwood, Grunewald & Dewey
ATTYS.

DISPENSING GUN

Original Filed March 23, 1963 3 Sheets-Sheet 2

INVENTORS
CARL J. FRENZEL
JAMES C. GREEN
BY
Grant, Lockwood, Tannenbaum & Dewey
ATTYS.

DISPENSING GUN

Original Filed March 23, 1963 3 Sheets-Sheet 3

INVENTORS
CARL J. FRENZEL
JAMES C. GREEN
BY
Grist, Lockwood, Greenawalt & Dewey
ATTYS.

United States Patent Office

Re. 26,180
Reissued Apr. 4, 1967

26,180
DISPENSING GUN

Carl J. Frenzel, Chicago, and James C. Green, Glen Ellyn, Ill., assignors to Skil Corporation, Chicago, Ill., a corporation of Delaware Original No. 3,208,628, dated Sept. 28, 1965, Ser. No. 268,679, Mar. 28, 1963. Application for reissue Jan. 24, 1966, Ser. No. 538,110
13 Claims. (Cl. 222—39)

Matter enclosed in heavy brackets [ ] appears in the original patent but forms no part of this reissue specification; matter printed in italics indicates the additions made by reissue.

This invention relates to dispensing guns, and more particularly to a motor powered dispensing gun adapted to dispense a relatively viscous material.

Modern day building construction techniques employ adhesive and sealants to an ever increasing extent because of the ready availability of adhesive and sealants in varying types and at economical prices and because the use of these materials permits rapid and economical building construction. For example, wall paneling in buildings is quickly and easily secured in place by using a suitable adhesive rather than by using metal fasteners. Seals are commonly formed in building construction at the intersection between a wall and ceiling or floor by depositing viscous sealant material between the framework of the wall and the surface of the ceiling or floor. In most instances these adhesives and sealants, which are relatively viscous materials, are deposited in continuous beads for securing members together or forming seals as the case may be.

It is quite common to provide building construction adhesives and sealants in bulk form in rather large containers for use at the job site, i.e., the adhesive or sealant is loaded into a conventional caulking type dispensing gun for being dispensed therefrom. More recently, these adhesives and sealants have been provided in cartridge form for being dispensed by such conventional caulking-type dispensing guns. Known caulking-type dispensing guns are of time honored construction including a barrel having a piston therein, which piston is adapted to be actuated by a hand operated trigger assembly. Manifestly, it is not feasible from the viewpoint of economical operation to dispense viscous materials from conventional hand operated dispensing guns because of operator fatigue and because of the relatively slow rate which materials may be dispensed from such guns. Because of the inability of known dispensing guns to lend themselves to use in modern day building construction techniques, there has developed a serious need for a light weight, economical, easy to operate, motor powered dispensing gun for dispensing relatively viscous materials.

Accordingly, it is a primary object of this invention to provide a motor powered dispensing gun adapted to dispense a relatively viscous material provided in bulk form or provided in disposable cartridge form.

It is a further object of this invention to provide a new and improved dispensing gun characterized by a barrel having a motor powered piston therein, which motor is of the reversible type providing forward and reverse movement to the piston, thereby facilitating loading of the dispensing gun as well as dispensing a viscous material therefrom.

It is an even further object of this inventino to provide a new and improved dispensing gun characterized by a barrel having a motor powered piston therein, wherein the motor is of the reversible electric type and geared to the piston for providing forward and reverse movement to the latter upon corresponding forward and reverse rotation of the motor.

It is a still further object of the present invention to provide a new and improved dispensing gun characterized by a barrel having a motor powered piston therein, wherein the motor is of the electric type having trigger-actuated speed control means associated therewith for controlling the speed of the electric motor and thereby the speed of movement of the piston.

A further object of this invention is to provide a new and improved dispensing gun characterized by a barrel having a motor powered piston therein, wherein the motor is of the electric type and wherein novel stop means are associated with the piston for indicating the innermost position of the piston in the barrel to prevent damage to the electric motor.

An even further object of the present invention is to provide a spout assembly of unique construction for use with a dispensing gun characterized by a barrel having a motor powered piston therein, which spout assembly includes a plurality of spouts for simultaneously depositing a plurality of parallel spaced-apart beads of viscous material.

A still further object of the present invention is the provision of a novel filling attachment for a dispensing gun characterized by a barrel having a motor powered piston therein, which filling attachment facilitates loading of the gun with a viscous material provided in bulk form.

An even further object of the present invention is the provision of a new and improved dispensing gun which will fulfill all of the objectives set forth above and which will be of light weight and simple construction readily lending itself to economical production and operation.

These and other objects and advantages of the present invention will become apparent from the following specification wherein like numerals refer to similar parts throughout.

In the drawings:

FIG. 1 is a partial elevation and a partial central longitudinal section of one embodiment of the dispensing gun of this invention, the gun being shown configured for dispensing a viscous material provided in cartridge form;

FIG. 2 is a schematic drawing of the electric circuit of the dispensing gun of FIG. 1;

Figure 3:
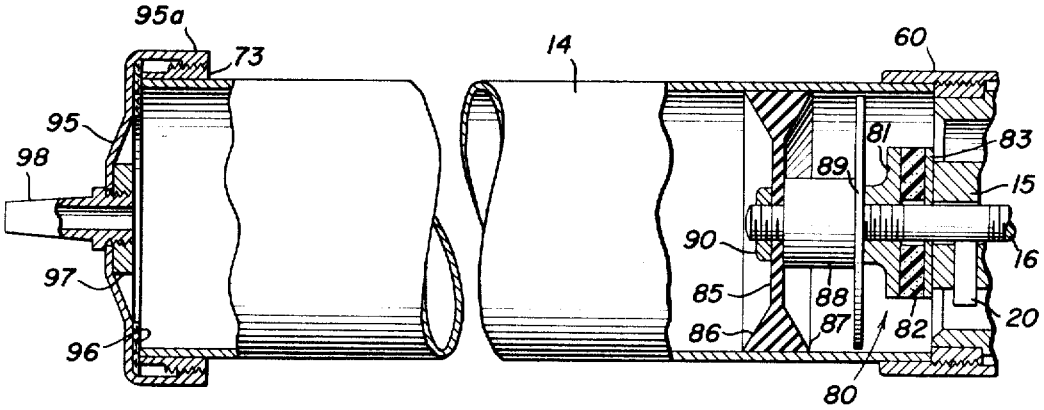
FIG. 3 is a partial elevation and partial central longitudinal section showing a fragmentary portion of the dispensing gun of FIG. 1, the gun being shown configured for dispensing a viscous material provided in bulk form.

Briefly, and by way of introduction, the new and improved dispensing gun of this invention includes a housing having a pistol grip-type handle portion and a barrel detachably secured to the housing. A piston is provided in the barrel and a piston rod secured to this piston extends into the housing. The piston rod is non-rotatably mounted in the housing and is externally threaded along substantially the entire length thereof. A drive gear is provided in the housing, which drive gear includes a central threaded bore in threading engagement with the external threads on the piston rod. A reversible electric motor and pinion gear driven thereby are provided in the housing, which pinion gear is adapted for engagement [wtih] *with* the drive gear for rotation of the latter. Appropriate switch means are provided for selectively energizing the electric motor for rotation either in a forward or reverse direction, and variable speed control means are provided for controlling the speed of rotation of the electric motor in the forward direction thereof. Energizing the electric motor for rotation in the forward direction thereof results in corresponding rotation of the drive gear for forward movement of the piston to dispense a material in the barrel of the gun. Energizing the electric motor for rotation in the reverse direction thereof results in corresponding rotation of the drive gear for reverse or rearward movement of the piston rod and piston secured thereto to load the barrel of the gun. The dispensing gun of this invention is adapted to dispense a relatively viscous material, such as adhesives or sealants, provided in bulk form or provided in disposable cartridge form, and the gun is provided with a number of separate cylinders of different lengths and diameters corresponding to the sizes of cartridges to be used. Separate pistons are provided for accommodating either the base plate of a cartridge or the inside wall of the barrel when viscous material is contained in the barrel in bulk form. The dispensing gun of this invention further includes a spout assembly for simultaneously depositing a plurality of parallel spaced-apart beads of viscous material. Even further, the dispensing gun includes a filling attachment providing for expeditious loading of viscous material in bulk form in the barrel of the gun.

Now referring to the drawings and more particularly to FIG. 1, the dispensing gun of this invention will be seen to include a housing 10 having a pistol grip handle portion 12 depending therefrom. A barrel 14 adapted to contain a supply of viscous material in bulk form or in a cartridge form is detachably secured to the housing 10. The housing includes an integral inner nose portion 15 which is centrally apertured for freely receiving a piston rod 16, which piston rod is externally threaded along substantially the entire length thereof. The piston rod includes a slot 18 extending substantially along the entire length thereof, which slot is adapted to receive slidably a key 20 secured in a transversely extending aperture in nose portion 15. It will be understood that piston rod 16 is adapted for axial reciprocal but nonrotatable movement within housing 10. Preferably, the piston rod is considerably longer than the longitudinal length of the housing for allowing maximum movement of the piston rod. The housing 10 is provided with a tubular extension 22 extending co-axially with the barrel 14 and oppositely thereof from the rear portion of the housing. The tubular extension 22 is adapted to extend snugly through an opening 23 provided in the rear wall of the housing with the inner end of the tubular extension being in threading engagement with an integral housing portion 24. The outer end of tubular extension 22 has a cap 25 secured thereto. It will be understood that the tubular extension has a length sufficient for receiving and enclosing the piston rod 16 and for permitting complete free axial reciprocatory movement of the latter.

A drive gear 28 having oppositely extending co-axial hub portions 28a and 28b rotatably supported in bearing inserts 29 and 30, respectively, is provided for imparting forward and reverse movement to the piston rod 16 upon corresponding forward and reverse rotation of the drive gear. The drive gear 28 has a central threaded bore 31 in threading engagement with the externally threaded piston rod 16. A thrust bearing in the form of a pair of ball bearing assemblies 33 and 34 on either side of the drive gear is provided for permitting free rotation of the drive gear while preventing axial movement of the same in the housing 10. Ball bearing assembly 33 is rotatably disposed between an annular race formed on the forward side of drive gear 28 and a race formed on the face of a flange portion of bearing insert 29. Similarly, ball bearing assembly 34 is rotatably disposed between an annular race formed on the rear side of drive gear 28 and a race formed on the surface of a flange portion of bearing insert 30.

A reversible electric motor 37 of known construction is suitably mounted within housing 10, which motor includes a shaft 38 supported in a bearing 39 and having a pinion gear 40 on the end thereof. The teeth of the pinion gear 40 are adapted to be in mating or meshing engagement with the teeth of drive gear 28 at all times.

The handgrip portion 12 of the housing includes a fitting 42 adapted to receive one end of an electric cord 43 for connecting the dispensing gun of this invention with a suitable source of electric power, e.g., an electric outlet or a battery depending on the type of electric motor used. The handgrip further includes a forwardly facing opening 44 for receiving a trigger 45, which trigger is pivotally mounted within handgrip portion 12 by a pivot pin 46. Trigger 45 has a spring clip 48 secured to the rear side of, which spring clip is adapted to have the free end thereof engage and depress a button 49 of an on-off switch 50. The trigger also includes a knob or button 52 at the top thereof for engaging the lower end of a depending plunger 54 of a carbon wafer speed control unit 55. The carbon wafer unit, which provides variable speed control means for the electric motor 37, includes a stack of carbon wafers or discs, each disc being in contact with adjacent discs. When the discs are in their normal position, i.e., when a plunger 54 is not raised by trigger 45, they are not closely packed together and they offer considerable resistance to the passage of electric current. Raising of plunger 54 by inward movement of trigger 45 results in compacting of the carbon wafers together for forming an improved electric conductor and thereby offering less resistance to the passage of electric current through the carbon wafers. In effect, unit 55 acts as a variable resistor, and it is provided for varying the speed of forward rotation of electric motor 37. Switch 50 is provided for energizing and de-energizing electric motor 37 in the forward direction thereof. A spring loaded toggle-type reverse switch 57 is provided for operating the reversible electric motor in the reverse direction thereof. It will be understood that suitable leads (not shown in FIG. 1) are provided for placing cord 43, switches 50, 57, unit 55 and electric motor 37 in appropriate electrical connection. FIG. 2 is a schematic drawing of the electrical circuit of the dispensing gun which will be referred to hereinbelow.

The operation of the above described means for imparting reciprocal axial movement to piston rod 16 is as follows:

Rotation of drive gear 28 in one direction, called the forward direction herein, results in movement of piston rod 16 in a forward direction (to the left as seen in FIG. 1) by virtue of the threading engagement between the external threads of the piston rod and the threads in the bore of the drive gear and by virtue of the non-rotatable mounting of the piston rod. Forward rotation is imparted to drive gear 28 by rotation of pinion gear 40 when the reversible electric motor 37 is energized for rotation in the forward direction thereof. Forward rotation is imparted to motor 37 by depressing trigger 45 with reverse switch 57 in the spring loaded or normal position thereof. FIG. 2 shows the normal or spring loaded position of switch 57 in solid lines and the reverse position of switch 57 in dashed lines. With switch 57 in its normal position closing of switch 50 by initial inward movement of the trigger results in a flow of current in one direction through unit 55 and motor 37. Continued inward movement of trigger 45 results in compacting of the carbon wafers in unit 55 thereby decreasing the resistance therein for increasing the speed of the electric motor. Movement of switch 57 to the momentary or reverse position (the dashed line position as seen in FIG. 2) results in a reverse flow of current through motor 37 for reverse rotation of the same. It will be noted that when switch 57 is in the reverse position switch 50 and unit 55 are by-passed. In other words, the variable speed unit 55 is only used for controlling the forward speed of rotation of electric motor 37. Manifestly, rotation of electric motor 37 in a reverse direction results in reverse rotation of drive gear 28 for corresponding reverse movement of piston rod 16.

Referring again to FIG. 1, barrel 14 is detachably engageable with casing 10 by means of a sleeve 60 secured to the barrel and internally threaded for threading engagement with threads of a ring member 61, which ring member is secured in an annular recess in an outer integral nose portion 62 of casing 10.

In FIG. 1 barrel 14 is shown with a cylindrical cartridge 64 therein, which cartridge includes a spout 65 at one end thereof and an axially displaceable base plate 66 at the other end thereof. It will be understood that cartridge 64, which is of known type and is readily commercially available, is adapted to contain a supply of relatively viscous material such as an adhesive or sealant, and the cartridge is adapted to have the adhesive or sealant contained therein dispensed through spout 65 by inward movement of base plate 66. A piston 70 having a central threaded bore 71 adapted for threading engagement with the forward end of piston rod 16 is provided to engage the cartridge base plate 66. It will be apparent that forward actuation of piston 70 by corresponding forward rotation of drive gear 28 driven by motor 37 will result in forward movement of base plate 66, i.e., movement of this plate inwardly of the cartridge 64 for discharge of the contents of the cartridge through spout 65. Housing nose portion 62 includes a plurality of small bores 62a for admitting air behind the piston during forward movement of the latter.

A cap 72 is provided for closing the forward end of barrel 14, which cap has a skirt portion 72a internally threaded for threading engagement with a ring 73 secured to the outside of barrel 14. Cap 72 also includes a gasket 74 secured to the inside thereof, which gasket is adapted to engage the forward end of barrel 14 and ring 73. The cap is provided with a central opening 76 for receiving the spout 65 therethrough. It will be realized that cap 72 is readily detachable for cartridge insertion and removal in the barrel of the dispensing gun.

It will be understood that the dispensing gun of this invention is adapted to be provided with a number of separate barrels and pistons for accommodating cartridges of varying sizes. Also, cap 72 is provided in different sizes for accommodating corresponding barrel sizes, and such cap members may be provided with central openings of various sizes and shapes for accommodating the particular spout structure of a cartridge.

The dispensing gun of this invention includes novel means for indicating to an operator of the gun the rearwardmost position of the piston in the barrel. Such means serve to prevent damage to the reversible electric motor which would result by continued energizing of the motor in the reverse direction thereof after the piston had reached its innermost position in the barrel. The novel means is in the form of a stop member generally designated 80, which stop member is adapted to be mounted on the piston rod 16 adjacent the piston. As seen in FIG. 1, the stop member 80 includes a bushing 81 adapted to be threadingly mounted on the piston rod. The stop member 80 further includes a compressible ring 82, which ring is adapted to be mounted on the piston rod 16 adjacent bushing 81. Ring 82 may be made of sponge rubber or other like resilient material. Stop member 80 further includes a washer 83, which washer is adapted to be mounted on piston rod 16 adjacent the rear face of the compressible ring 82. Preferably, the stop member 80 is formed as a single unit with the bushing and washer being fixed to opposite faces of the ring by a suitable adhesive material, for example. As the piston reaches its rearwardmost position in the barrel upon being actuated by reverse switch 57, the stop member 80 will be compressed between the rear face of the piston and the forward face of the nose portion 15 of the dispensing gun housing. The stop member cushions the arrival of the piston at its rearwardmost position in the barrel so that the piston and piston rod come to a gradual stop rather than an abrupt stop which would result if the piston itself contacted the nose portion 15 of the casing. During this cushioning or gradual retardation of the movement of the piston and piston rod the load on electric motor 37 increases resulting in a sound which is audible to an operator of the tool indicating to him that reverse switch 57 must be released. It should be apparent that stop member 80 serves as an indicator for informing an operator of the gun to release switch 57 for preventing damage to electric motor 37. Stop member 80 obviates the use of a reverse limit switch or microswitch and an appropriate circuit for automatically deenergizing the electric motor when the piston has reached its rearwardmost position in the barrel. Therefore, the provision of the stop member permits the dispensing gun of this invention to be of simpler construction with the advantages of low cost and simplicity in operation. The stop member 80 also acts to prevent damage to the threads on the piston rod or in the bore of drive gear 28, which damage would result by continued rotation of the drive gear after the piston rod had reached its rearwardmost position in the gun. Further, stop member 80 prevents the transmission of operational shocks to the casing of the gun, which shocks would result from impact of the piston with the nose portion 15 of the casing.

The dispensing gun of this invention is also adapted to dispense a viscous material, such as an adhesive or sealant, provided in bulk form. In other words, the material to be dispensed may be directly contained in the barrel of the gun itself rather than in a cartridge housed in the barrel. FIG. 3 shows the dispensing gun (barrel 14 and a fragmentary portion of the nose of casing 10) configured for dispensing a viscous material in bulk form. The piston 70 of FIG. 1 is detached from piston rod 16 and replaced by a resilient piston 85 having opposed annular lips 86 and 87, a spacing sleeve 88 and a guide disc 89. Sleeve 88 is threadingly engageable with the piston rod and abuts one face of guide disc 89 for holding the latter against the forward face of bushing 81. A nut 90 threadingly engageable with the piston rod secures piston 85 against the forward face for sleeve 88. The piston which may be made of hard rubber or other suitable material, has an outside diameter insuring a close fit between lips 86 and 87 and the inside walls of barrel 14. It will be understood that a viscous material is adapted to be directly contained in barrel 14 forward of piston 85 and dispensed from the barrel by forward movement of piston 85. During this forward movement of the piston 85, lip 86 snugly and firmly engages the inside wall of the barrel to prevent leakage of the viscous material around the periphery of the piston. Lip 87 on the opposite side of the piston serves to prevent leakage of air around the piston when the latter is being withdrawn in the barrel during filling of the barrel with a viscous material.

The dispensing gun includes a cap 95 to be used when a viscous material in bulk form is contained in barrel 14 to be dispensed therefrom, or when a cartridge is used, which cartridge does not have its own spout. Cap 95, which is similar to cap 72 of FIG. 1, includes a skirt portion **95*a* internally threaded along a portion thereof for threading engagement with the threads on barrel ring 73. Cap 95 also includes a gasket 96 secured to the inside thereof. The cap has a central aperture and a nut 97 secured to the inside of the cap co-axially with this aperture. A spout or nozzle 98 is externally threaded at the inner end thereof for threading engagement with the threads of nut 97. Spout 98 may be detached from cap 95 for cleaning purposes, etc., or for replacement by spouts of different configurations. It should be noted that in many instances cap 95 may be used with the barrel 14 when a viscous material in cartridge form is being dispensed by merely removing spout 98 from cap 95. In some instances, however, the configuration of the nose of a disposable cartridge having its own spout may not fit well within cap 95, and in this case it is desirable to use the cap 72** of FIG. 1.

Referring again to the piston assembly shown in FIG. 3, guide disc 89 has an outside diameter less than the inside diameter of barrel 14 for providing a small annular clearance space between the outside of the guide disc and the inside of the barrel. In other words, guide disc 89 slides freely within the barrel during actuation of piston 85. The guide disc serves a very important function when the dispensing gun is being configured for dispensing a material in bulk form. When it is desired to dispense a viscous material in bulk form a suitable barrel 14 is selected (separate barrels of varying lengths and diameters may be provided for dispensing material in bulk form) and attached to the dispensing gun by threading engagement of sleeve 60 with housing ring 61. Because of the tight fit between piston 85 and the inside walls of the barrel, it is preferable to attach barrel 14 before attaching the piston to the gun. Before barrel 14 is secured in place, piston rod 16 is preferably removed from the gun. After barrel 14 is secured in place, piston rod 16 is threaded in drive gear 28 and withdrawn in the barrel until the guide disc is positioned just inwardly of the outer end of the barrel. Next, piston 85 is attached to the end of the piston rod by nut 90. Because of spacer 88 the piston may be secured to the end of piston rod 16 while guide disc 89 remains within the forward end of the barrel. After piston 85 is secured in place, reverse switch 57 is actuated for withdrawing the piston in the barrel. While the piston is being attached to the piston rod and during rearward movement of the piston rod and piston, guide disc 89 acts to maintain the piston rod in concentric spaced relation within the barrel. This action of the guide disc prevents difficulty in withdrawing piston 85 within the barrel.

Figure 4:
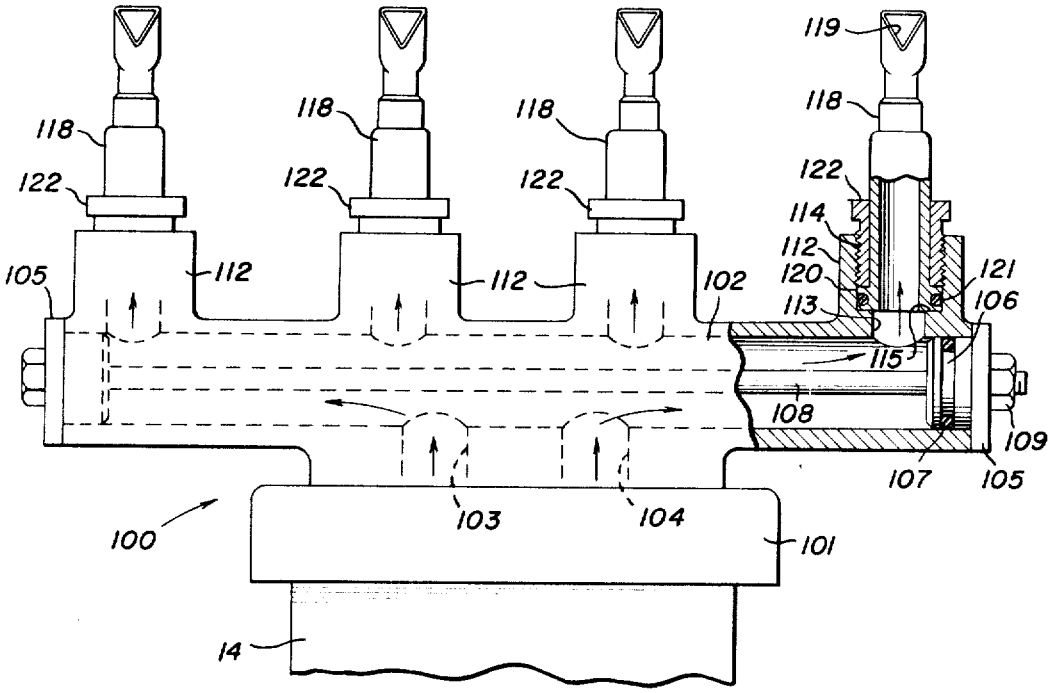
FIG. 4 is a partial elevation and partial section of a spout assembly adapted to be used with the dispensing gun of this invention.

This invention includes a spout assembly for simultaneously depositing a plurality of parallel spaced-apart beads of relatively viscous material. As seen in FIG. 4, the spout assembly, generally designated 100, includes a cap portion 101 and a transversely extending hollow tubular portion 102. The tubular portion 102 may be integral with cap portion 101 or secured thereto by any suitable means. Cap portion 101 is internally threaded for threading engagement with the external threads on ring 73 of barrel 14. Cap portion 101 includes a pair of axially extending openings 103, 104 for communicating the interior of barrel 14 with the interior of hollow tubular portion 102. The tubular portion 102 is closed at opposite ends thereof by a pair of plugs 105, each of which plugs includes an annular recess 106 adapted to receive an O-ring 107 for forming a seal at the ends of tubular portion 102. Plugs 105 are detachably held in place by a through bolt 108 and a nut 109. Tubular portion 102 includes a plurality of parallel cylindrical extensions 112 evenly spaced along the length thereof, and each of the tubular extensions 112 has a central bore 113 communicating with the interior of the tubular portion. As all cylindrical extensions 112 are identical, only one will be described in detail.

Cylindrical extension 112 has an enlarged internally threaded portion 114 separated from bore 113 by an annular shoulder 115. A spout or nozzle 118 having a triangular-shaped discharge opening 119 at one end thereof and an annular flange 120 at the other end thereof is adapted to be received within tubular extension 112 with the annular flange 120 in abutting engagement with shoulder 115. Flange 120 includes an annular recess adapted to receive an O-ring 121 for forming a seal between spout 118 and extension 112. A nut 122 centrally bored for receiving spout 118 and externally threaded for threading engagement with the threads in bore 114 is provided to hold spout 118 in place in tubular extension 112. It will be apparent that material in barrel 14 may be forced through openings 103, 104 and into tubular portion 102 for simultaneous discharge through each of the spouts 118.

In the embodiment shown in FIG. 4, four evenly spaced-apart spouts 118 are provided. This embodiment of the spout assembly is useful in applying a viscous adhesive material to a vertically elongated section of wall board, which wall board is used extensively in the building industry. The spouts 118 are spaced apart a distance allowing an operator to deposit the desired amount of adhesive on one face of the wall board by making a single pass along the longitudinal axis of the wall board. It will be realized, of course, that the embodiment of the spout assembly shown in FIG. 4 is not to be limited to the specific arrangement shown. The spacing and number of spouts 118 may be varied to accommodate a particular need. It will be apparent that spout assembly 100 may be quickly and easily disassembled for cleaning purposes by removal of plugs 105 and by removal of spouts 118 by loosening and removing nuts 122.

As is known to those skilled in the art, filling or loading of caulking guns or the like with a viscous material, such as putty or an adhesive, etc., in bulk form is a troublesome operation because of the tendency of these materials to adhere to external portions of the gun especially around the forward end of the gun barrel which is usually immersed in the material for loading purposes. After the gun has been used a short time these materials on the exterior of the barrier tend to become quite firm making it difficult for replacement of the cap or spout at the nose portion of the barrel. To prevent the nose portion of the barrel from being immersed in a supply of viscous material, a dispensing or caulking gun is often loaded by the use of a stick, a spoon or the like. This way of loading cannot be done in a neat manner, and it is quite time consuming. This invention provides a novel filling attachment making it possible for quick and easy loading of the dispensing gun of this invention in a neat and efficient manner.

Figure 5:
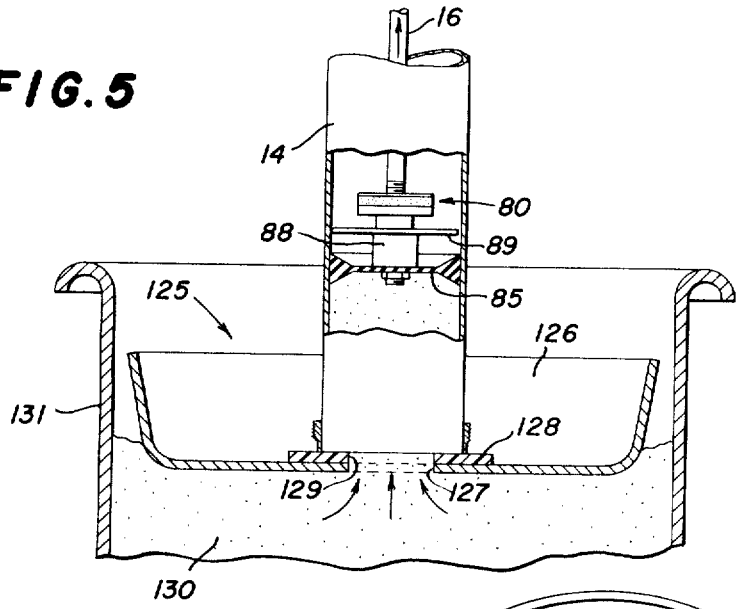
FIG. 5 is a partial elevation and partial section showing the dispensing gun of this invention and the filling attachment therefor.
Figure 6:
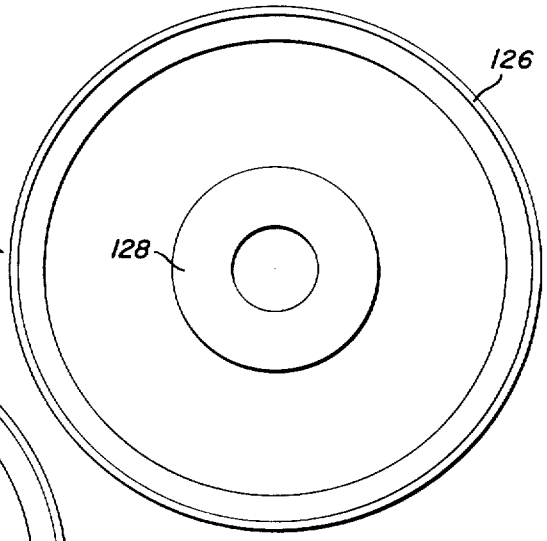
FIG. 6 is a top plan view of the filling attachment of this invention.

As seen in FIGS. 5 and 6, the filling attachment of this invention, generally designated 125, includes a generally pan-shaped body member 126, which body member includes a centrally disposed aperture 127 in the base portion thereof. A gasket 128 having an aperture 129 is secured to the inside of body 126 co-axial with the aperture 127. The diameters of apertures 127 and 129 are preferably no larger than the diameter of the smallest barrel 14 to be provided with the dispensing gun of this invention. The gasket 128 has an outside diameter adapting the gasket to accommodate all sizes of barrels provided with the dispensing gun for forming a seal between the end of the barrel and the inside of the body member.

As illustrated in FIG. 5, the filling attachment 125 permits rapid and easy filling of the dispensing gun of this invention in a neat manner by first resting the filling attachment on the surface of a viscous material 130 provided in bulk form in a container 131. The body 126 of the filling attachment has a diameter adapting the attachment to fit within a typical container with a relatively small annular clearance space between the rim of the filling attachment and the inside walls of the container. With the filling attachment in place on the surface of a viscous material to be loaded in the dispensing gun, cap 72 or 95 is removed from the barrel of the gun and the gun is held by an operator so that the forward end of the barrel rests on gasket 128. Now the barrel may be quickly and easily filled with viscous material by actuating reverse switch 57 and holding the dispensing gun in contact with the filling attachment thereby forcing viscous material 130 into barrel 14 through apertures 127 and 129 by atmospheric pressure. If desired, filling of the barrel may be expedited by pressing downwardly on the gun which causes the filling attachment to be moved downwardly in the container thereby aiding in forcing material into the barrel. In this instance filling attachment 125 serves the dual function of assisting in forcing material into the barrel and preventing contact of the end or forward portion of the barrel with the viscous material. The exterior of the barrier remains clean and free from material making it easy for attachment of the cap or spout assembly as the case may be.

Figure 7:
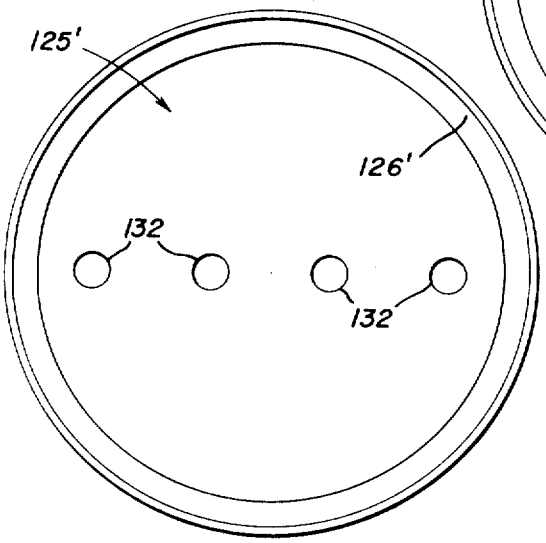
FIG. 7 is a top plan view of a modified form of filling attachment.

FIG. 7 illustrates a modified filling attachment 125', which attachment has a body portion 126' including four evenly spaced-apart apertures 132. The apertures 132 are spaced apart to accommodate the spouts 118 of spout assembly 100. When the spout assembly is used with the dispensing gun of this invention, the filling attachment 125' permits quick and easy loading of the gun without detaching the spout assembly. Of course, it will be realized that spout assembly 100 may be removed and the barrel of the dispensing gun loaded by using the filling attachment 125 illustrated in FIGS. 5 and 6.

Thus it will be seen that this invention provides a new and improved dispensing gun for dispensing a relatively viscous material such as an adhesive or sealant. The dispensing gun permits easy and uniform dispensing of one or more beads of viscous material, and the dispensing gun is adapted to dispense an adhesive provided in either cartridge form or in bulk form. When it is desired to dispense a material provided in bulk form, means are provided for quickly and easily loading the gun with bulk material in a neat manner.

While the invention has been shown in but one form it will be obvious to those skilled in the art that it is not to be so limited, but on the contrary it is susceptible of various changes and modifications without departing from the spirit and scope of the appended claims.

We claim:

1. A dispensing gun comprising, in combination, a housing having a barrel adapted to contain a supply of material to be dispensed, a piston in said barrel and a piston rod secured to the piston and extending into said housing through a nose portion of the latter, an axially compressible stop member encircling said piston rod between said piston and said nose portion, power means and gear means operated thereby in said housing, said gear means being operatively associated with said piston rod for imparting forward and reversed movement to the same upon corresponding forward and reverse rotation of the gear means, said power means including reversible motor means adapted to be selectively activated for imparting forward and reverse movement of said piston, said stop member being adapted to be compressed between said piston and said nose portion when the piston reaches its innermost position in said barrel.

2. A dispensing gun for dispensing a relatively viscous material in bulk form comprising, in combination, a housing having a detachable barrel adapted to receive a supply of said material, which barrel includes a removable cap at the end thereof remote from said housing, a piston assembly in said barrel and a piston rod secured to the piston assembly and extending into said housing, said piston assemby including a detachable resilient piston and a guide disc parallel with the piston and spaced inwardly therefrom, which guide disc has an outside diameter providing a relatively small annular clearance space between the disc and the inside of said barrel, power means in said housing and gear means driven thereby, said gear means being operative associated with said piston rod for imparting forward and reverse movement to the same upon corresponding forward and reverse rotation of the gear means, said power means including reversible motor means adapted to be selectively activated for imparting said forward and reverse movement, said piston rod being adapted to move said resilient piston along the length of said barrel and to a position exteriorly of the same adjacent said one end thereof when said cap is removed, said guide disc being adapted to maintain said piston rod in concentric spaced relation within said barrel when said piston is moved to said position.

3. A dispensing gun for dispensing a relatively viscous material in bulk form comprising, in combination, a housing having a detachable barrel adapted to receive a supply of said material, which barrel includes a removable cap at the end thereof remote from said housing, a piston assembly in said barrel and an externally threaded piston rod secured to the piston assembly and extending into said housing, said piston assembly including a detachable resilient piston and a guide disc parallel with the piston and spaced inwardly therefrom, which disc has an outside diameter providing a relatively small annular clearance space between the guide disc and the inside of said barrel, a drive gear having a central threaded bore in threading engagement with said piston rod for imparting forward and reverse axial movement to the same upon corresponding forward and reverse rotation of the drive gear, and motor means in said housing for selectively imparting forward and reverse rotation to said drive gear, said piston rod being adapted to move said resilient piston along the length of said barrel and to a position exteriorly of the same adjacent said one end thereof when said cap is removed, said guide disc being adapted to maintain said piston rod in concentric spaced relation within said barrel when said piston is moved to said position.

4. A dispensing gun for dispensing relatively viscous materials contained in a disposable cylindrical cartridge, which cartridge has an opening at one end thereof and an axially displaceable base plate at the other end thereof, said gun comprising, in combination, a housing having a barrel adapted to receive said cartridge, which barrel includes a cap having an aperture adapted for alignment with said opening, a piston in said barrel adapted to engage said base plate and an externally threaded piston rod secured to the piston and extending into said housing through a nose portion of the latter, an axially compressible stop member encircling said piston rod between said piston and said nose portion, means for preventing rotation of said piston rod, a drive gear having a central threaded bore in threading engagement with said piston rod for imparting forward and reverse axial movement to the same upon corresponding forward and reverse rotation of the drive gear, a reversible electric motor in said housing and a pinion gear driven thereby, which pinion gear is engageable with said drive gear for rotation of the latter, said housing including a tubular extension co-axial with said barrel and extending oppositely of the same for receiving and enclosing said piston rod during movement of the latter, said electric motor being adapted to be selectively energized for actuating said piston and said stop member being adapted to be compressed between said piston and said nose portion when the piston reaches its innermost position in said barrel for indicating said position to an operator of the gun.

5. The dispensing gun according to claim 4 further defined by trigger actuated variable speed control means for said reversible electric motor.

6. The dispensing gun according to claim 5 wherein said speed control means is characterized by a carbon wafer speed control unit.

7. A dispensing gun for dispensing a relatively viscous material in bulk form comprising, in combination, a housing having a detachable barrel adapted to receive a supply of said material, which barrel includes a removable cap at the end thereof remote from said housing, a piston assembly in said barrel and an externally threaded piston rod secured to the piston assembly and extending into said housing through a nose portion of the latter, said piston assembly including a detachable resilient piston and a guide disc parallel with the piston and spaced inwardly therefrom, which guide disc has an outside diameter providing a relatively small annular clearance space between the guide disc and the inside of said barrel, an axially compressible stop member encircling said piston rod between *said* guide disc and said nose portion, means for preventing rotation of said piston rod, a drive gear having a central threaded bore in threading engagement with said piston rod for imparting forward and reverse axial movement to the same upon corresponding forward and reverse rotation of the drive gear, a reversible electric motor in said housing and a pinion gear driven thereby, which pinion gear is engageable with said driving gear for rotation of the latter, said housing including a tubular extension co-axial with said barrel and extending oppositely of the same for receiving and enclosing said piston rod during movement of the latter, said electric motor being adapted to be selectively energized for actuating said piston and said stop member being adapted to be compressed between said guide disc and said nose portion when the piston reaches its innermost position in said barrel for indicating said position to an operator of the gun, said piston rod being adapted to move said resilient piston along the length of said barrel and to a position exteriorly of the same adjacent said end thereof when said cap is removed, said guide disc being adapted to maintain said piston rod in concentric spaced relation within said barrel when said piston is moved to said position.

8. The dispensing gun according to claim 7 further defined by trigger actuated variable speed control means for said reversible electric motor.

9. The dispensing gun according to claim 8 wherein said speed control means is characterized by a carbon wafer speed control unit.

10. A dispensing gun comprising, in combination, a housing having a barrel adapted to contain a supply of material to be dispensed, a piston in said barrel and an externally threaded piston rod secured to the piston and extending into said housing, means for preventing rotation of said piston rod, a drive gear having a central threaded bore in threading engagement with said piston rod for imparting forward and reverse axial movement to the same upon corresponding forward and reverse rotation of the drive gear, reversible electric motor means in said housing and a pinion gear driven thereby, which pinion gear is engageable with said drive gear for rotation of the latter, carbon wafer speed control means electrically connected to said motor and trigger means for actuating said speed control means, whereby the speed of said motor may be varied.

11. A dispensing gun for dispensing a relatively viscous material comprising, in combination, a housing having a barrel adapted to receive a supply of such material, which barrel includes a removable cap at the end thereof remote from said housing, a piston assembly in said barrel and a piston rod secured to the piston assembly and extending into said housing, said piston assembly including a detachable piston and a guide disc parallel with the piston and spaced inwardly therefrom, which guide disc has an outside diameter providing a relatively small annular clearance space between the disc and the inside of said barrel, power means in said housing operatively associated with said piston rod for imparting forward and reverse movement to the same, said power means being adapted to move said piston along the length of said barrel to a position exteriorly of the same adjacent said one end thereof when said cap is removed, said guide disc being adapted to maintain said piston rod in concentric spaced relation within said barrel when said piston is moved to said position.

*12. A dispensing gun comprising, a housing enclosing a reversible electric motor, speed control means in said housing connected with said motor for operating the latter in at least one direction thereof at various speeds, which speed control means include an operating trigger supported by said housing, a pinion gear driven by said motor, a drive gear mounted for rotation about its central axis, said drive gear being engaged by said pinion gear for forward rotation in response to operation of said motor in said one direction, said drive gear including a central bore coaxial with its axis of rotation, an externally threaded rod coaxial with said drive gear and received within said bore, said drive gear including means engaged with said rod for imparting forward and reverse axial movement to the latter upon corresponding forward and reverse rotation of the former, elongated support means carried by said housing and adapted to contain a supply of material to be dispensed, a member on one end of said rod and positioned for forward and reverse movement along said support means upon corresponding movement of said rod, said member being adapted to discharge material from said support means upon forward movement of the member.*

*13. A dispensing gun comprising, a housing having an extension adapted to contain a supply of material to be dispensed, an externally threaded piston rod extending into said housing and into said extension centrally of the latter, a piston on one end of said rod positioned for forward and reverse movement along said extension in response to corresponding movement of the piston rod, which piston is adapted to discharge material from said extension upon forward movement of the same, a drive gear mounted for rotation about its central axis, which drive gear includes a central bore in which said rod is received, said drive gear including means adjacent the bore thereof and engaged with said rod for imparting forward and reverse axial movement to the same upon corresponding forward and reverse rotation of the drive gear, reversible electric motor means in said housing and a pinion gear driven thereby, which pinion gear is engaged with said drive gear for rotation of the latter, speed control means connected with said motor for operating the latter in at least one direction thereof at various speeds, operation of said motor in said one direction serving to rotate said drive gear in the forward direction thereof, and a trigger supported by said housing and connected with said speed control means for actuating the latter.*

References Cited by the Examiner

UNITED STATES PATENTS

| | | | |
|---|---|---|---|
| 1,553,305 | 9/1925 | Broadwell | 222—333 |
| 1,776,659 | 9/1930 | Geffon et al. | 222—333 X |
| 1,829,789 | 11/1931 | Dammeyer | 222—333 |
| 1,883,201 | 10/1932 | Wheeler | 222—390 X |
| 1,981,495 | 11/1934 | Butler | 141—27 |
| 2,169,291 | 8/1939 | Rotter | 222—334 |
| 2,336,457 | 12/1943 | Augensen | 141—27 |
| 2,601,169 | 6/1952 | Purvis | 141—27 |
| 2,715,484 | 8/1955 | Alexander | 222—478 |
| 2,913,151 | 11/1959 | Wiseman et al. | 222—390 X |
| 2,960,261 | 11/1960 | Stenberg | 222—478 |

ROBERT B. REEVES, *Primary Examiner.*

KENNETH N. LEIMER, *Examiner.*